US012671011B2

(12) United States Patent
Gustafsson et al.

(10) Patent No.: US 12,671,011 B2
(45) Date of Patent: Jun. 30, 2026

(54) PROFILE WIRE CONDUCTOR AND A POWER CABLE

(71) Applicant: NKT HV Cables AB, Lyckeby (SE)

(72) Inventors: Kristian Gustafsson, Karlskrona (SE); Tommy Johansson, Bräkne-Hoby (SE)

(73) Assignee: NKT HV Cables AB, Lyckeby (SE)

(*) Notice: Subject to any disclaimer, the term of this patent is extended or adjusted under 35 U.S.C. 154(b) by 112 days.

(21) Appl. No.: 18/510,741

(22) Filed: Nov. 16, 2023

(65) Prior Publication Data

US 2024/0170181 A1 May 23, 2024

(30) Foreign Application Priority Data

Nov. 23, 2022 (EP) .................................... 22209005

(51) Int. Cl.

| | |
|---|---|
| ***H01B 7/28*** | (2006.01) |
| ***H01B 7/285*** | (2006.01) |
| ***H01B 9/02*** | (2006.01) |
| ***H01B 13/06*** | (2006.01) |
| ***H01B 13/22*** | (2006.01) |

(52) U.S. Cl.

CPC ............... *H01B 7/285* (2013.01); *H01B 9/02* (2013.01); *H01B 13/06* (2013.01); *H01B 13/22* (2013.01)

(58) Field of Classification Search

CPC ... H01B 5/08; H01B 7/14; H01B 7/28; H01B 7/285; H01B 9/02; H01B 13/06; H01B 13/22

USPC ........... 174/36, 38, 40 R, 102 R–110 R, 112, 174/113 R–117 FF, 128.1

See application file for complete search history.

(56) References Cited

U.S. PATENT DOCUMENTS

| | | | | |
|---|---|---|---|---|
| 2,022,839 A * | 12/1935 | Austin | ................... | H01B 5/107 57/215 |
| 3,813,772 A * | 6/1974 | Adams | ............... | H01B 13/0235 57/215 |
| 4,687,884 A * | 8/1987 | DeHart | .................... | H01B 5/02 174/128.1 |
| 5,430,255 A | 7/1995 | Downie et al. | | |

(Continued)

FOREIGN PATENT DOCUMENTS

| | | |
|---|---|---|
| CN | 204680461 U | 9/2015 |
| DE | 19522627 A1 | 1/1997 |

(Continued)

OTHER PUBLICATIONS

Extended European Search Report; Application No. 22209005.2; Completed: Apr. 21, 2023; Mailed: May 4, 2023; 8 Pages.

*Primary Examiner* — William H. Mayo, III

(74) *Attorney, Agent, or Firm* — Whitmyer IP Group LLC

(57) ABSTRACT

A profile wire conductor for an electric power cable has a central longitudinal axis and includes stranded individual profile wires arranged in concentric wire layers around the central longitudinal axis. The concentric wire layers include an inner wire layer of profile wires of a first type having a first radial cross sectional geometry, and an outermost wire layer of profile wires forming an outer surface of the profile wire conductor. At least one of the profile wires in the outermost wire layer is of a second type and has a second radial cross sectional geometry being different to the first radial cross sectional geometry. The profile wires of the second type form an indentation or protrusion in the outer surface of the profile wire conductor.

16 Claims, 4 Drawing Sheets

(56) References Cited

U.S. PATENT DOCUMENTS

| | | | | | |
|---|---|---|---|---|---|
| 5,711,143 | A * | 1/1998 | Munakata | H01B 5/104 | 57/215 |
| 5,732,875 | A * | 3/1998 | Ziemek | H01B 13/2633 | 228/148 |
| 6,331,677 | B1 * | 12/2001 | Munakata | H01B 5/104 | 174/128.1 |
| 6,734,366 | B2 * | 5/2004 | Kikuchi | H01B 5/104 | 174/128.1 |
| 7,622,681 | B2 * | 11/2009 | Kikuchi | H01B 5/006 | 174/40 R |
| 2004/0182598 | A1 | 9/2004 | Waltz | | |
| 2012/0163758 | A1 * | 6/2012 | McCullough | H01B 3/427 | 385/101 |
| 2021/0020328 | A1 | 1/2021 | Furuta | | |

FOREIGN PATENT DOCUMENTS

| | | | |
|---|---|---|---|
| EP | 1158638 | B1 | 7/2003 |
| JP | 2014199817 | A | 10/2014 |
| RU | 2631421 | C1 | 9/2017 |
| WO | 2018004210 | A1 | 1/2018 |

* cited by examiner

PROFILE WIRE CONDUCTOR AND A POWER CABLE

TECHNICAL FIELD

The present disclosure generally relates to a profile wire conductor and a power cable comprising a profile wire conductor.

BACKGROUND

Power cables typically comprise a conductor covered by an insulation system including e.g. a semiconductive layer and an insulation layer. The insulation system may move axially relative to the conductor due to thermal shrinkage, especially close to the cable ends or at a rigid joint close to the conductor joint. As a result, a portion of the conductor may thus become exposed, i.e., without the surrounding insulation system. The length of exposed conductor is called shrink back. The shrink back typically reaches a steady state after a number of heat cycles.

There are several ways to reduce shrink back. For example, the connection sleeve of a rigid joint and the end portion of the insulation system adjacent to the connection sleeve may be provided with a respective circumferential groove interlocked by means of an anchoring element as disclosed by EP1158638. Nevertheless, it would be desirable to provide alternative means for reducing shrink back or axial movement of the insulation system relative to the conductor.

The problem with shrink back is particularly prominent for conductors having a smooth surface, such as solid conductors. However, there are also other types of conductors which are prone to shrink back, e.g. profile wire conductors. In a profile wire conductor, also called keystone wire conductor, individual profile wires are shaped such that when the profile wires are stranded in concentric wire layers by a stranding machine, a very high filling grade is achieved. Thus, in the stranding machine, the profile wires combine almost seamlessly to a circular conductor.

SUMMARY

A general object of the present disclosure is to provide a profile wire conductor and a power cable that solves or at least mitigates the problems of the prior art.

According to a first aspect, there is hence provided a profile wire conductor for an electric power cable, the profile wire conductor having a central longitudinal axis and comprising stranded individual profile wires arranged in concentric wire layers around the central longitudinal axis, the concentric wire layers comprising an inner wire layer of profile wires of a first type having a first radial cross sectional geometry, and an outermost wire layer of profile wires forming an outer surface of the profile wire conductor, at least one of the profile wires in the outermost wire layer being of a second type and having a second radial cross sectional geometry being different to the first radial cross sectional geometry, wherein the profile wire of the second type forms an indentation or protrusion in the outer surface of the profile wire conductor.

Due to the indentation or protrusion in the outer surface of the profile wire conductor formed by the profile wire of the second type, the profile wire conductor will increase the friction forces and/or tortional forces to handle the axial shrinkage force of the insulation system arranged around the profile wire conductor. Thus, the indentation or protrusion in the outer surface of the profile wire conductor provides a good grip of the insulation system. In other words, the geometry of the outer surface of the profile wire conductor being at least partly defined by said indentation or protrusion, reduce the shrink back of the insulation system arranged around the profile wire conductor. Hereby, risk of failures due to shrink back of the insulation system is reduced.

In other words, the radial cross sectional geometry of at least one of the individual profile wires in the outermost wire layer is different from the radial cross sectional geometry of the individual profile wires in the inner wire layer. The inner wire layer may be adjacent the outermost wire layer, i.e. the inner wire layer may be arranged concentrically inside, and in contact with, the outermost wire layer. Thus, the profile wires of the inner wire layer are compactly arranged with the profile wires of the outermost wire layer, wherein in each case two adjacent profile wires in the inner wire layer and the outermost wire layer make physical contact with one another continuously in the circumferential direction, and along the longitudinal axis. The inner wire layer may be described as the wire layer arranged second to the outermost wire layer, or may be referred to as a first inner wire layer.

The radial cross sectional geometry is to be understood as the geometry of the profile wires in a radial cross section. The radial cross section is a cross section in the radial direction of the corresponding profile wire, or of the profile wire conductor, i.e. perpendicular to the central longitudinal axis. The radial cross sectional geometry may be defined by the shape and/or size of the radial cross section. According to one example embodiment, the radial cross sectional shape of at least one of the individual profile wires in the outermost wire layer is different from the radial cross sectional shape of the individual profile wires in the inner wire layer. The shape of the radial cross sectional geometry may be referred to as the profile of the radial cross sectional geometry. To clarify, the radial cross sectional geometry of two different profile wires may be of the same shape, i.e. the same radial cross sectional shape (e.g. both being shaped as a trapezoid), but differ in size. Thus, the two different profile wires are said to be congruent in shape (radial cross sectional shape) but non-congruent in size. Congruent in shape thus means that the radial cross sectional geometry of two different profile wires have the same shape, and congruent in size means that the radial cross sectional geometry of two different profile wires have the same size.

According to one embodiment, any radial cross section along the central longitudinal axis of the profile wire conductor comprises said indentation or protrusion in the outer surface of the profile wire conductor formed by the profile wires of the second type. Hereby, the protrusion or indentation extends along the profile wire conductor in the longitudinal direction, and the improved grip of the insulation system is provided along the longitudinal direction.

According to one embodiment, the stranded individual profile wires are helically layed along the central longitudinal axis, wherein said indentation or protrusion in the outer surface of the profile wire conductor forms at least one helically shaped protrusion or indentation following the lay of the profile wires of the outermost wire layer. Hereby, the protrusion or indentation extends along the profile wire conductor in the longitudinal direction as well along the circumferential direction of the profile wire conductor, and the improved grip of the insulation system is provided along the longitudinal direction as well as along the circumferential direction. Moreover, by providing the helically shaped protrusion or indentation following the lay of the profile wires of the outermost wire layer, manufacturing of the profile wire conductor with said indentation or protrusion is facilitated, as the indentation or protrusion follow the lay of the profile wires.

According to one embodiment, the first radial cross sectional geometry has the shape of an annulus sector, or of a trapezoid. The shape of a trapezoid is to be understood to include a shape in which two opposites sides of the trapezoid is curved. Typically the shape of the trapezoid is the shape of an isosceles trapezoid with two of its opposite sides, or opposite bases, curved. The two opposite sides which are curved are typically the side of the radial cross section facing the center of the profile wire conductor, and the side of the radial cross section facing away from the center of the profile wire conductor. The curvature of such sides is typically along the circumferential direction of the profile wire conductor. The width of the prolife wires thus increases with the radius of the profile wire conductor. Such shape is throughout the application text commonly referred to as an annulus sector, or a trapezoid.

According to one embodiment, the second radial cross sectional geometry has the shape of a pentagon or a hexagon with two of its opposite sides being curved. Hereby, the indentation or protrusion in the outer surface of the profile wire conductor is formed by the pentagonal or hexagonal shape of the radial cross section of the profile wires of the second type, or by the interaction of the pentagonal or hexagonal shape of the radial cross section of two adjacent profile wires of the second type.

The two opposite sides which are curved are typically the side of the radial cross section facing the center of the profile wire conductor, and the side of the radial cross section facing away from the center of the profile wire conductor. The curvature of such sides is typically along the circumferential direction of the profile wire conductor. The width of the prolife wires thus increases with the radius of the profile wire conductor.

According to one embodiment, the second radial cross sectional geometry has a shape different to the annulus sector, or trapezoid, of the first radial cross sectional geometry.

According to one embodiment, for the profile wires of the second type, the protrusion or indentation is formed somewhere along the side, or base, of the radial cross sectional geometry facing outwards away from the center of the profile wire conductor. According to one embodiment, for the profile wires of the second type, the protrusion or indentation is formed at the intersection of the side, or base, of the radial cross sectional geometry facing outwards away from the center of the profile wire conductor, and the sides of the radial cross sectional geometry extending in the radial direction.

According to one embodiment, the second radial cross sectional geometry has a shape of an annulus sector, or trapezoid, with beveled edges, or cut-off corners, at its outermost side. That is, the side, or base, of the radial cross sectional geometry forming the outer surface of the profile wire conductor has beveled, or cut-off, corners. Stated differently, the intersections of the side, or base, of the radial cross sectional geometry facing outwards away from the center of the profile wire conductor, and the sides of the radial cross sectional geometry extending in the radial direction, are formed by beveled edges.

According to one embodiment, all of the profile wires in the inner wire layer have the same radial cross sectional geometry, both with regards to shape and size.

According to one embodiment, all of the profile wires in the outermost wire layer have the same radial cross sectional geometry, both with regards to shape and size.

According to one embodiment, the first and second radial cross sectional geometries are non-congruent in shape and in size. According to one embodiment, the first and second radial cross sectional geometries are non-circular.

According to one embodiment, the profile wires of the inner wire layer have a radial cross sectional shape of an annular sector or trapezoid, while at least one of the profile wires, such as e.g. all of the profile wires, of the outermost wire layer has a radial cross sectional shape different to that of an annular sector or trapezoid.

According to one embodiment, at least one of the profile wires in the outermost wire layer is of a third type and having a third radial cross sectional geometry being different to the second radial cross sectional geometry.

Thus, according to such embodiment, the profile wires in the outermost wire layer do not have the same radial cross sectional geometry, with regards to shape and/or size. For example, the profile wires of the third type may have a radial cross sectional geometry of a larger size compared to the profile wires of the second type (but preferably with the same radial cross sectional shape). Thus, the profile wires of the third type extend further in the radial direction than the profile wires of the second type. According to one embodiment, every other of the profile wires in the outermost wire layer is of the second type, and every other of the profile wires in the outermost wire layer is of the third type. Thus, profile wires of the second type may be neighbouring to profile wires of the third type.

According to one embodiment, the profile wires of all of the first, second and third types may have radial cross sectional geometries of congruent shapes and non-congruent sizes. Such shape is typically the previously mentioned annulus sector or trapezoid. Thus, the profile wires of the first and second types may be non-congruent in size, but congruent in shape, as long as the profile wires of the second type forms an indentation or protrusion in the outer surface of the profile wire conductor, e.g. as a result of that the profile wires of the second type are neighbouring to profile wires of the third type.

According to one embodiment, the indentation or protrusion has an extension in the radial direction of between 0.5 mm and 3 mm, and/or the indentation or protrusion has an extension in the circumferential direction of between 0.5 mm and 3 mm. Such size of the indentation or protrusion effectively reduces the shrink back of the insulation system arranged around the profile wire conductor. According to one embodiment, the indentation or protrusion has an extension in the radial direction of between 1 mm and 2 mm, or between 1.5 mm and 3 mm, and/or the indentation or protrusion has an extension in the circumferential direction of between 1 mm and 2 mm, or between 1.5 mm and 3 mm.

The indentation may be described as a radially inwards extending indentation, and the protrusion may be described as a radially outwards extending protrusion. As both the indentation and protrusion may be formed as a helically formed indentation and protrusion, the indentation and protrusion may extend the whole way around the periphery of the profile wire conductor.

According to one embodiment, the profile wire of the second type forms an indentation and/or a protrusion in the outer surface of the profile wire conductor. That is, the profile wire of the second type may form an indentation and a protrusion in the outer surface of the profile wire conductor. For example, the profile wires of the second type form an indentation in the outer surface of the profile wire conductor, and the profile wires of the third type form a protrusion in the outer surface of the profile wire conductor.

According to one embodiment, the concentric wire layers comprise more than one inner wire layer. That is, the profile wire conductor may comprise a plurality of inner wire layers arranged concentrically inside of the outermost wire layer. Typically, all profile wires in one specific inner wire layer have the same radial cross sectional geometry, typically with the same shape and size. Moreover, the radial cross sectional geometry of the profile wires in different inner wire layers are typically congruent in shape but not in size. Thus, in embodiments in which the profile wire conductor comprises a plurality of inner wire layers, all inner wire layers are typically formed by profile wires of the same radial cross sectional shape. Stated differently, all profile wires of the inner wire layers have a radial cross sectional geometry with congruent shapes. Such shape is typically the previously mentioned annulus sector or trapezoid. However, the individual profile wires of different inner wire layers are typically having a radial cross sectional geometry with non-congruent sizes.

According to one embodiment, all of the inner wire layers of the profile wire conductor are formed of profile wires, possibly with the exception of a centre wire. The centre wire may e.g. have a circular radial cross sectional shape. Thus, according to one example, the profile wire conductor comprises a centre wire having a circular radial cross sectional shape, an outermost wire layer of profile wires for which at least one is of the second type, and one or more inner wire layers arranged in between the centre wire and the outermost wire layer wherein all of the inner wire layers are profile wire layers.

According to a second aspect, there is provided a power cable having a profile wire conductor according to the first aspect. The power cable comprises a semiconductive layer arranged around the profile wire conductor forming an interface between the profile wire conductor and the semiconductive layer, the interface being at least partly defined by the indentation or protrusion in the outer surface of the profile wire conductor.

Effects and features of the second aspect are largely analogous to those described above in connection with the first aspect. Embodiments mentioned in relation to the first aspect, in particular with regards to the profile wire conductor, are largely compatible with the second aspect.

According to one embodiment, the power cable comprises an insulation system arranged to cover the profile wire conductor, wherein the insulation system comprises said semiconductive layer. Thus, the insulation system may comprise a semiconductive layer (or semiconducting conductor shield) arranged closest to the profile wire conductor (i.e. closest with regards to the insulation system). Typically, the insulation system further comprises an insulation layer, or an electrically insulation layer, arranged in contact with, and outside of, the semiconductive layer. Optionally, said semiconductive layer is a first semiconductive layer, and the insulation system further comprises a second semiconductive layer (or semiconductive insulation shield) arranged in contact with, and outside of, the insulation layer. Optionally, the insulation system further comprises one or more outer layers arranged outside of the second semiconductive layer, such as e.g. a metallic shield and a sheath.

According to one embodiment, the insulation system is more than 8 mm thick. For example, the insulation system is 8-45 mm thick, such as e.g. 8.3-38 mm thick, or 8.8-40.5 mm thick. The indentation or protrusion in the outer surface of the profile wire conductor formed by the profile wire of the second type is particularly efficient for reducing shrink back of the insulation layer for such relative thick insulation systems. For example, the semiconductive layer (or semiconducting conductor shield) is 0.3-3 mm thick and the insulation layer is 8-35 mm thick. According to one embodiment, the second semiconductive layer (or semiconductive insulation shield) is 0.5-2.5 mm thick.

According to one embodiment, the power cable comprises a conductor tape forming the interface between the profile wire conductor and the semiconductive layer (or insulation system), wherein the conductor tape is tightly arranged onto the profile wire conductor preserving the indentation or protrusion in the outer surface of the profile wire conductor. Hereby, the stranded individual profile wires can be fixated by the conductor tape without noticeably impairing the technical effect of the indentation or protrusion in the outer surface of the profile wire conductor. Thus, the conductor tape is arranged in contact with, and in between, the profile wire conductor and the semiconductive layer, wherein the indentation or protrusion between the conductor tape and the semiconductive layer has an extension in the radial direction of between 0.5 mm and 3 mm, and/or the indentation or protrusion has an extension in the circumferential direction of between 0.5 mm and 3 mm. The conductor tape may e.g. be 0.1-0.2 mm thick.

The semiconductive layer may be an extruded layer. According to one embodiment, the semiconductive layer comprises a thermosetting polymer such as crosslinked polyethylene, XLPE. According to one embodiment, the semiconductive layer is thermoplastic, i.e. is formed of a thermoplastic composition. The semiconductive layer typically comprises an electrically conductive compound, such as e.g. carbon black.

The power cable may be a high voltage power cable, for example for voltages higher than 72 kV. According to one example, the power cable is a high voltage power cable, or an ultra-high voltage cable, for example for voltages higher than 450 kV, or higher than 550 kV, or higher than 800 kV.

The power cable may be an AC power cable or a DC power cable, such as e.g. a high voltage direct current, HVDC, cable.

According to a third aspect, there is provided a method for producing at least a part of a power cable. The method comprises

- providing a plurality of profile wires of at least a first type having a first radial cross sectional geometry and of a second type having a second radial cross sectional geometry being different to the first radial cross sectional geometry;
- stranding the plurality of profile wires in concentric wire layers around a central longitudinal axis to form a profile wire conductor having an inner wire layer of profile wires of the first type, and an outermost wire layer of profile wires forming an outer surface of the profile wire conductor in which at least one of the profile wires in the outermost wire layer is of the second type,
- wherein the profile wires of the second type form an indentation or protrusion in the outer surface of the profile wire conductor during the step of stranding the plurality of profile wires.

Effects and features of the third aspect are largely analogous to those described above in connection with the first and second aspects. Embodiments mentioned in relation to the first and second aspect, in particular with regards to the profile wire conductor, are largely compatible with the third aspect.

According to one embodiment, the method further comprises: guiding a sub-portion of profile wires into a reshaping tool; and reshaping said sub-portion of profile wires in said reshaping tool to form profile wires of the second type.

Hereby, profile wires of the second type, forming indentation or protrusion in the outer surface of the profile wire conductor, may be desirably shaped and provided. Moreover, the reshaping tool can be adapted to the desired size and shape of the sought indentation or protrusion in the outer surface of the profile wire conductor. For example, the reshaping tool may comprise a pair of opposed reforming cylinders including a knife, which are juxtaposed between a profile wire drawing machine and a pulling apparatus. Hereby, the sub-portion of the profile wires are pulled by the pulling apparatus from the profile wire drawing machine and through the reshaping tool.

As an alternative, the profile wires of the first and second types may be provided by casting or molding of the profile wires.

Corresponding to the first aspect, profile wires of a third type having a third radial cross sectional geometry being different to the second radial cross sectional geometry is provided. Hereby, the step of stranding comprises stranding the plurality of profile wires in concentric wire layers around a central longitudinal axis to form a profile wire conductor having an inner wire layer of profile wires of the first type, and an outermost wire layer of profile wires forming an outer surface of the profile wire conductor in which at least one of the profile wires in the outermost wire layer is of the second type and at least one of the profile wires in the outermost wire layer is of the third type. For example, the stranding is performed such that every other of the profile wires in the outermost wire layer is of the second type, and every other of the profile wires in the outermost wire layer is of the third type.

According to one embodiment, the method further comprises: tightly arrange a conductor tape onto the profile wire conductor while preserving the indentation or protrusion in the outer surface of the profile wire conductor.

According to one embodiment, the method further comprises: encasing the profile wire conductor with an insulation system.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
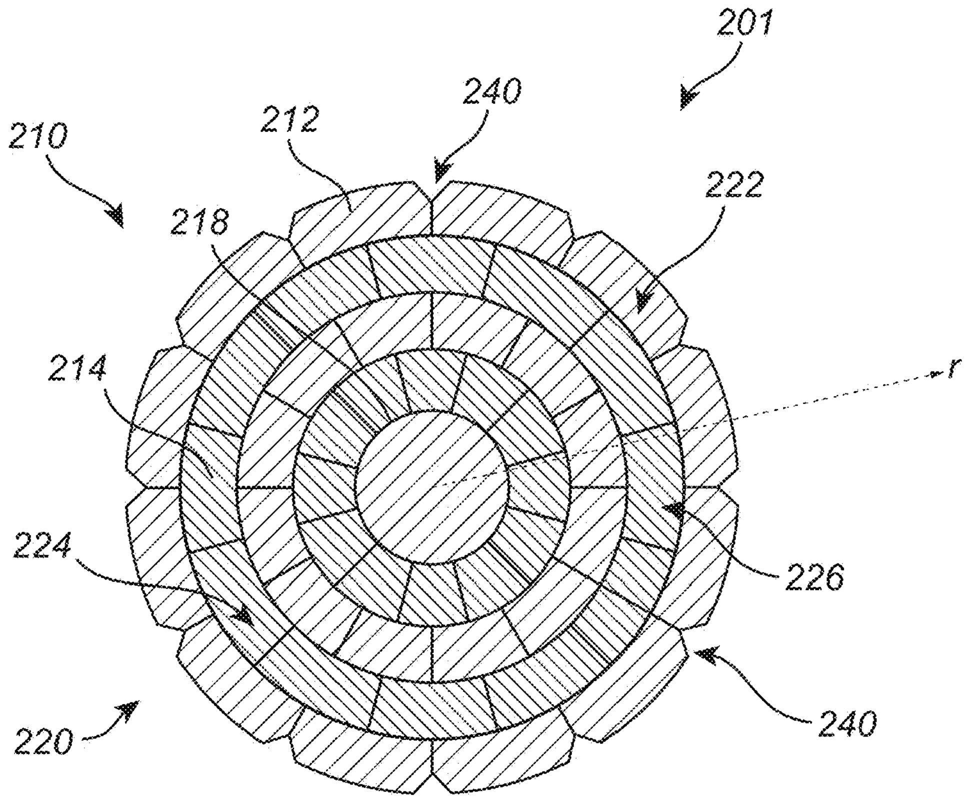
FIG. 1 schematically shows a radial cross section of a profile wire conductor of an example embodiment.
Figure 2:
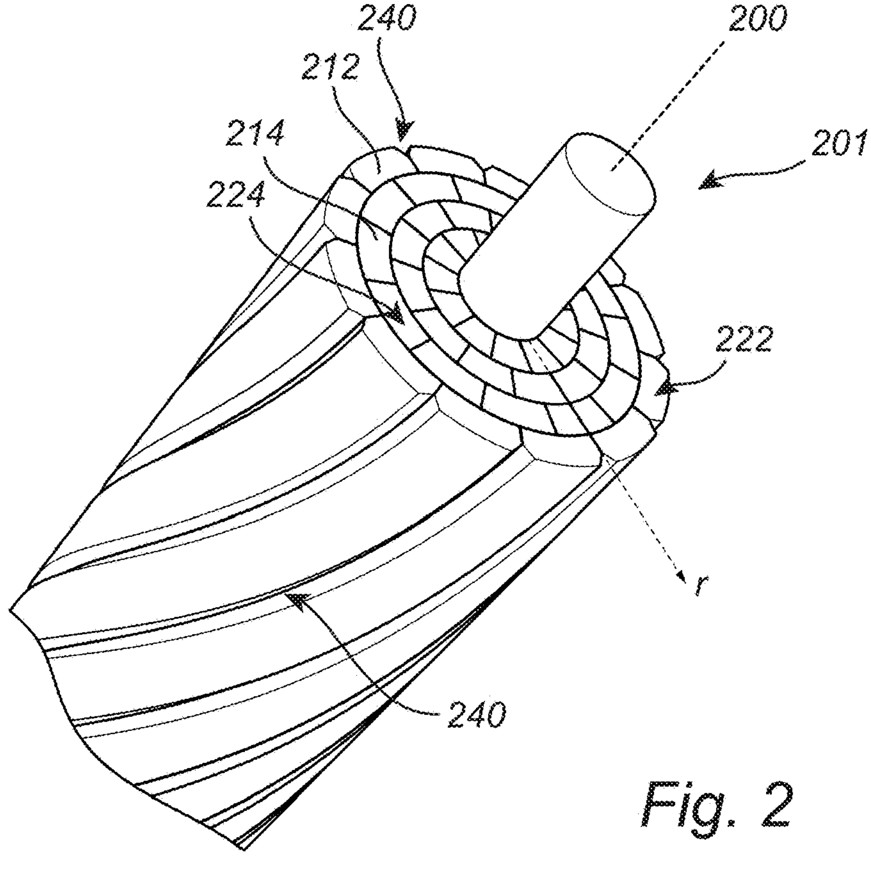
FIG. 2 is a perspective view of the profile wire conductor of FIG. 1, the profile wire conductor extending along a central longitudinal axis 200.

FIGS. 1 and 2 show an example of a profile wire conductor 201. In FIG. 1, a radial cross section of the profile wire conductor 201 is shown, and in FIG. 2, a perspective view of at least a part of the profile wire conductor 201 extending along a central longitudinal axis 200 is shown. The radial cross section is a cross section in the radial direction r of the profile wire conductor 201, i.e. perpendicular to the central longitudinal axis 200, as indicated in FIG. 2. The profile wire conductor 201 may e.g. be defined by cylindrical coordinates (by a radial distance r, azimuth φ which is the angle along the circumferential direction, and an axial coordinated along the longitudinal axis 200).

The profile wire conductor 201 comprises stranded individual profile wires 210 arranged in concentric wire layers 220 around the central longitudinal axis 200. The concentric wire layers 220 comprises an outermost wire layer 222 of profile wires 212 forming an outer surface of the profile wire conductor 201. Moreover, the concentric wire layers 220 comprises an inner wire layer 224 arranged in the embodiment of FIGS. 1 and 2 as the second outermost wire layer of the concentric wire layers 220, and is hereafter referred to as a first inner wire layer 224.

The first inner wire layer 224 is formed of profile wires 214 of a first type having a first radial cross sectional geometry. As shown in FIGS. 1 and 2, all of the profile wires 214 in the first inner wire layer 224 have the same radial cross sectional geometry, both in shape and in size.

The profile wires 212 of the outermost wire layer 222 are of a second type having a second radial cross sectional geometry being different to the first radial cross sectional geometry. For example, and as shown in FIGS. 1 and 2, the shape of the second radial cross sectional geometry differs from the shape of the first radial cross sectional geometry, i.e. the profile wires 212, 214 of the first and second types have cross sectional geometries of non-congruent shapes.

In FIGS. 1 and 2, the profile wires 212 of the second type forms indentations 240 in the outer surface of the profile wire conductor 201. However, it should be mentioned that not all of the profile wires in the outermost wire layer 222 need to be of the second type. Instead, one, or at least one, of the profile wires 212 in the outermost wire layer 222 is of the second type, and thus form a corresponding indentation 240 in the outer surface of the profile wire conductor 201.

As shown in FIG. 2, the indentations 240 extends along the longitudinal axis 200 of the profile wire conductor 201. Thus, any radial cross section along the central longitudinal axis 200 of the profile wire conductor 201 comprises the indentations 240, or indentation 240, in the outer surface of the profile wire conductor 201 formed by the profile wires 212 of the second type. In more detail, the stranded profile wires 210 of the embodiment of FIG. 2 are helically layed along the central longitudinal axis 200, such that the indentations 240 in the outer surface of the profile wire conductor 201 form helically shaped indentations 240 following the lay of the profile wires 210 of the outermost wire layer 222.

Figure 3:
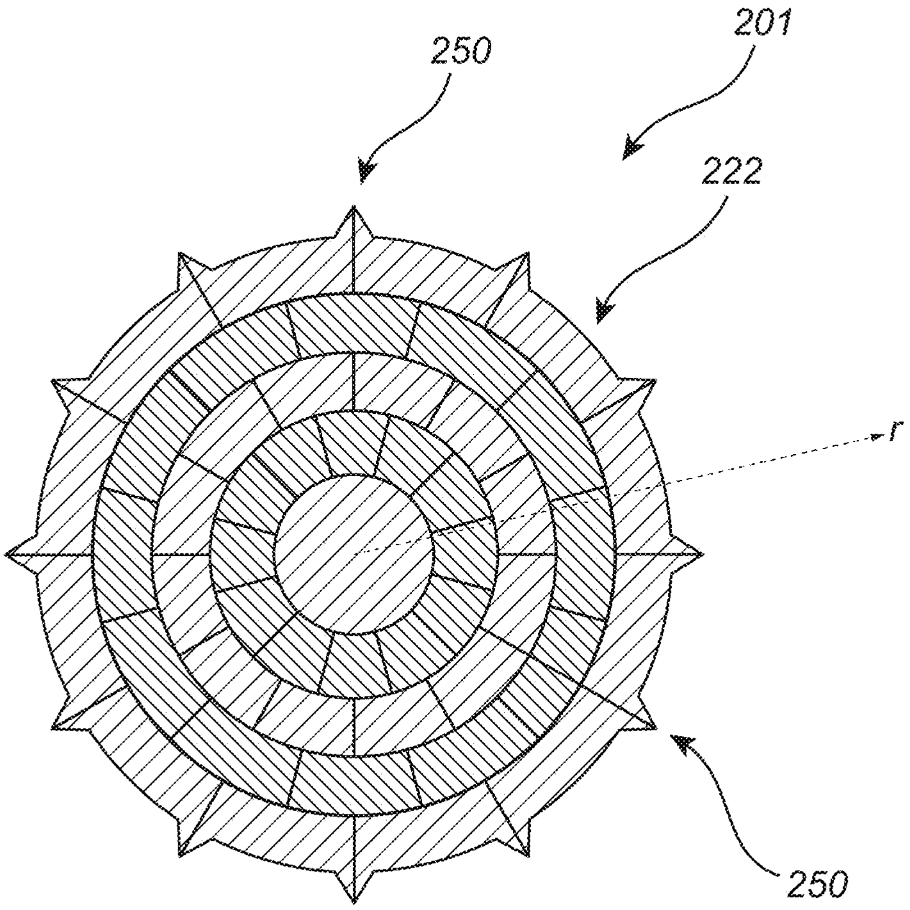
FIG. 3 schematically shows a radial cross section of a profile wire conductor of an alternative example embodiment.

By changing the radial cross sectional geometry of the second type of profile wires, the profile wires may instead of an indentation 240 form a protrusion 250 in the outer surface of the profile wire conductor 201, which is shown in the example embodiment of FIG. 3. Again, it should be mentioned that not all of the profile wires in the outermost wire layer 222 needs to be of the second type.

Typically, the indentation 240 or protrusion 250 has an extension in the radial direction r of between 0.5 mm and 3 mm, and/or the indentation 240 or protrusion 250 has an extension in the circumferential direction of between 0.5 mm and 3 mm.

In FIGS. 1 and 2, the profile wire conductor 201 comprises more than one inner wire layer. That is, the profile wire conductor 201 may comprise a plurality of inner wire layers 226 arranged concentrically inside of the outermost wire layer 222. Typically, all profile wires in one specific inner wire layer have the same radial cross sectional geometry, with the same shape and size. Moreover, as seen in FIGS. 1 and 2, the radial cross sectional geometry of the profile wires in different inner wire layers 226 are congruent in shape but not in size. Thus, in the embodiment of FIGS. 1 and 2, in which the profile wire conductor 201 comprises a plurality of inner wire layers 226, all inner wire layers 226 are formed by profile wires of the same radial cross sectional shape. As seen in FIGS. 1 and 2, the profile wire conductor 201 comprises a centre wire 218 having a circular radial cross sectional shape. Thus, the plurality of inner wire layers 226 are arranged in between the centre wire 218 and the outermost wire layer 222. All of the inner wire layers 226 of the profile wire conductor 201 are profile wire layers 226.

Figure 4A:
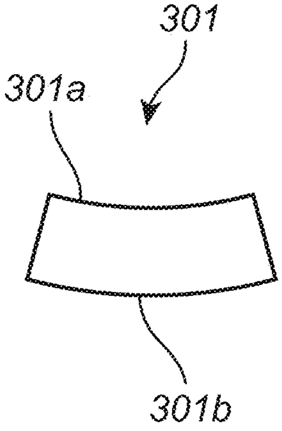
FIGS. 4A, 4B and 4C are radial cross sectional views of profile wires of the first and second type.

FIG. 4A is a radial cross sectional view of a profile wire being an example of a profile wire 214 of the first inner wire layer 224. The profile wire is an example of the previously mentioned first type with the first radial cross sectional geometry 301. The first radial cross sectional geometry 301 has the shape of an annulus sector, or may be described as having the shape of a trapezoid, such as an isosceles trapezoid, in which two opposites sides (the bases) 301*a*, 301*b* of the trapezoid is curved along the circumferential direction of the profile wire conductor.

Figure 4B:
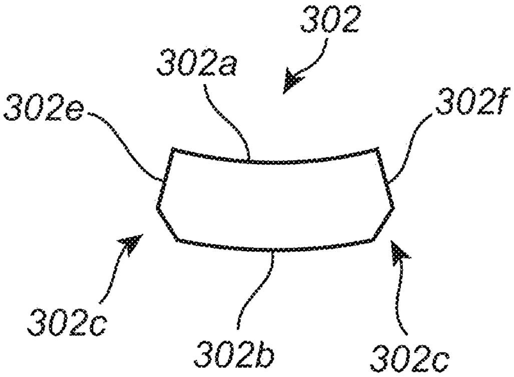

FIG. 4B is a radial cross sectional view of a profile wire being an example of a profile wire 212 of the outermost wire layer 222. The profile wire is an example of the previously mentioned second type with the second radial cross sectional geometry 302. The second radial cross sectional geometry has a shape deviating from that of an annulus sector (or trapezoid) as it comprises beveled edges, or cut-off corners, 302*c* at its outermost side (base) 302*b*. Stated differently, the intersections of the side (or base) 302*b* of the radial cross sectional geometry 302 facing outwards away from the center of the profile wire conductor, and the sides 302*e*, 302*f* of the radial cross sectional geometry 302 extending in the radial direction, are formed by beveled edges 302*c*. In other words, the second radial cross sectional geometry 302 has the shape of a hexagon with two of its opposite sides (or bases) 302*a*, 302*b* curved. Thus, the previously mentioned indentations 240 may be the result of the beveled edges 302*c*, as the profile wires 212 of the second type are arranged as the outermost wire layer 222. It should be noted that only one of the corners of the trapezoid may be cut-off (i.e. only comprising one of the beveled edges 302*c*), resulting in a radial cross sectional geometry with the shape of a pentagon with two of its opposite sides (or bases) 302*a*, 302*b* curved.

Figure 4C:
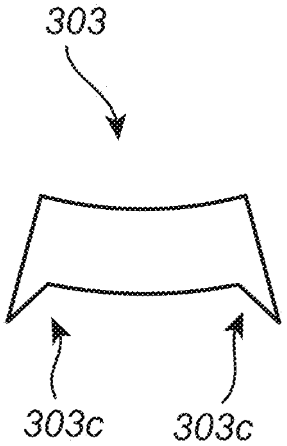

FIG. 4C is a radial cross sectional view of a profile wire being an example of a profile wire 212 of the outermost wire layer 222. The radial cross sectional geometry 303 of the profile wire is the same as that of the profile wire of FIG. 4B, except of that instead of beveled edges 302*c*, the corresponding position of the radial cross sectional geometry 303 of the profile wire comprises pointy corners 303*c*. Thus, the previously mentioned protrusions 250 of FIG. 3 may be the result of the pointy corners 303*c*, as the profile wires 212 of the second type are arranged as the outermost wire layer 222.

Figure 5:
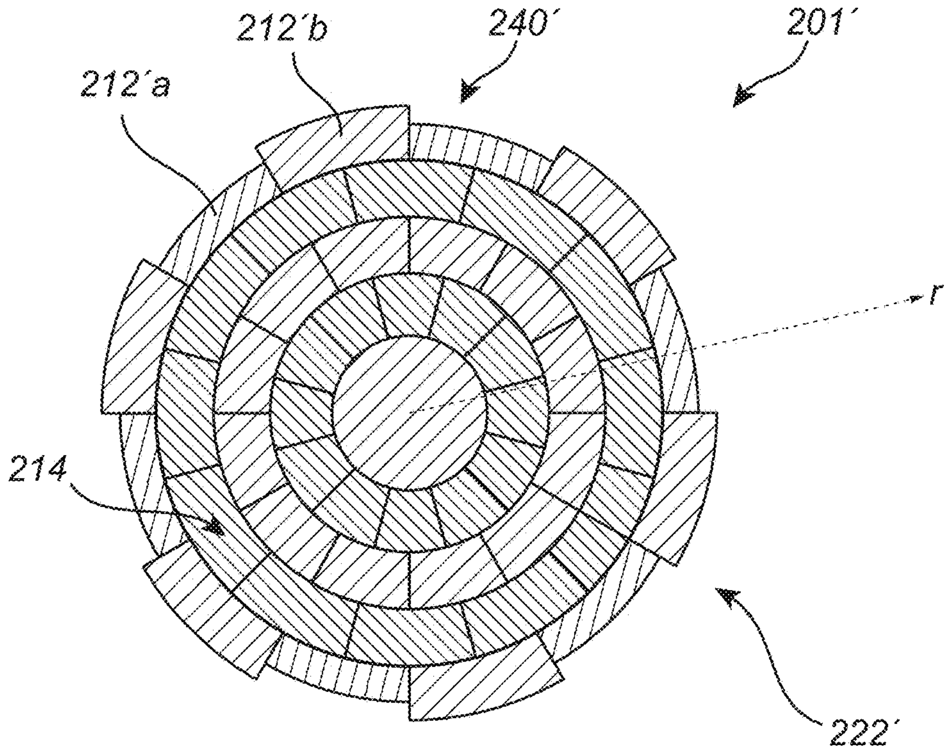
FIG. 5 schematically shows a radial cross section of a profile wire conductor of yet an alternative example embodiment.

Thus, as apparent from comparing FIG. 4A with FIG. 4B or FIG. 4C, the first and second radial cross sectional geometries may be non-congruent in shape. According to one example, at least one of the profile wires in the outermost wire layer is of a third type and having a third radial cross sectional geometry being different to the second radial cross sectional geometry. Such example profile wire conductor 201' is shown in FIG. 5. The profile wire conductor 201' is the same as the profile wire conductor 201 shown in FIGS. 1 and 2, except for the profile wires 212'*a*, 212'*b* of the outermost wire layer 222'. The profile wires 212'*a*, 212'*b* in the outermost wire layer 222' of the profile wire conductor 201' comprises profile wires 212'*a* of a second type and profile wires 212'*b* of a third type. Thus, the profile wires 212'*a*, 212'*b* in the outermost wire layer 222' of the profile wire conductor 201' may have different radial cross sectional geometries, with regards to shape and/or size. The profile wires 212'*a* of the second type has a second radial cross sectional geometry being different to the first radial cross sectional geometry of the first type of profile wires 214 (the profile wires 214 of the first type being the same as for the profile wire conductor 201 of FIGS. 1 and 2), typically by that the size of the second radial cross sectional geometry is larger than the size of the first radial cross sectional geometry (the shape of the first and second radial cross sectional geometry may however be the same in the example embodiment). In the example profile wire conductor 201' of FIG. 5, the profile wires 212'*b* of the third type have the same radial cross sectional shape (the annulus sector or trapezoid as previously described) but a radial cross sectional geometry of a larger size compared to the profile wires 212'*a* of a second type. Thus, the profile wires 212'*b* of the third type extends further in the radial direction r than the profile wires 212'*a* of the second type and thereby forms indentation 240' in the outer surface of the profile wire conductor 201'. As shown in the example of FIG. 5, every other the profile wires 212'*a*, 212'*b* in the outermost wire layer 222' is of the second type, and every other of the profile wires 212'*a*, 212'*b* in the outermost wire layer 222' is of the third type. Thus, profile wires 212'*a* of the second type may be neighbouring to profile wires 212'*b* of the third type.

Figure 6:
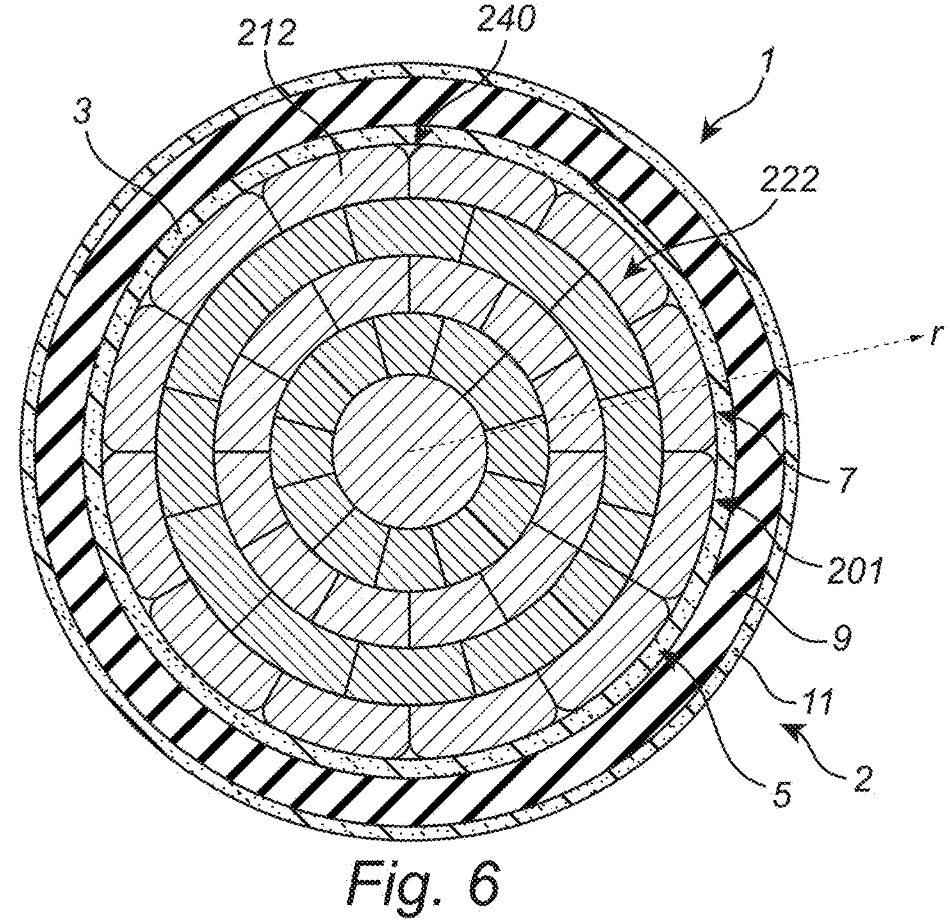
FIG. 6 schematically shows a radial cross section of a power cable comprising the profile wire conductor of FIGS. 1-2.

FIG. 6 show an example of a power cable 1 comprising the profile wire conductor 201 previously described. In FIG. 6, a radial cross section of the power cable 1 is shown.

The power cable 1 comprises an insulation system 2 arranged around the profile wire conductor 201. The insulation system 2 comprises a semiconductive layer 3 forming an interface 5 between the profile wire conductor 201 and the insulation system 2. The interface 5 is at least partly defined by the indentations 240 (or protrusions 250 as shown in the embodiment of FIG. 3) in the outer surface of the profile wire conductor 201.

Thus, the insulation system 2 may comprise a semiconductive layer (or semiconducting conductor shield) 3 arranged closest to the profile wire conductor 201. As shown in FIG. 6, the insulation system 2 may further comprise an insulation layer (an electrically insulation layer) 9, arranged in contact with, and outside of, the semiconductive layer 3. Optionally, the insulation system 2 further comprises a semiconductive layer (or semiconductive insulation shield) 11 arranged in contact with, and outside of, the insulation layer 9. Thus, the semiconducting conductor shield 3 may be referred to as a first semiconductive layer 3 and semiconductive insulation shield 11 may be referred to as a second semiconductive layer 11. Optionally, the insulation system further comprises one or more outer layers arranged outside of the second semiconductive layer, such as e.g. a metallic shield and a sheath (not shown).

The semiconductive layer(s) 3, 11 and/or the insulation layer 9 may comprise a thermosetting polymer. The thermosetting polymer may for example be XLPE, crosslinked ethylene propylene diene monomer rubber (EPDM), or crosslinked ethylene propylene rubber (EPR). The semiconductive layer(s) 3, 11 typically comprises an electric conductive compound such as e.g. carbon black.

According to one embodiment, the semiconductive layer (s) 3, ii and/or the insulation layer 9 is/are thermoplastic, i.e. is/are formed of a thermoplastic composition comprising e.g. polypropylene and LDPE or LLDPE.

The insulation system 2 interacts with the indentations 240 (or protrusions 250 as shown in the embodiment of FIG. 3) in the outer surface of the profile wire conductor 201 formed by the profile wires 212 of the second type. As the semiconductive layer (or semiconducting conductor shield) 3 is arranged closest to the profile wire conductor 201, the semiconductive layer 3 interacts with the indentations 240 (or protrusions 250 as shown in the embodiment of FIG. 3) in the outer surface of the profile wire conductor 201. Hereby, friction forces and/or tortional forces between the profile wire conductor 201 and the insulation system 2 is increased to reduce axial shrinkage forces. In other words, the geometry of the outer surface of the profile wire conductor 201 reduce the shrink back of the insulation system 2 arranged around the profile wire conductor 201.

The power cable 3 may comprise a conductor tape 7 forming the interface 5 between the profile wire conductor 201 and the insulation system 2, or in more detail, between the semiconductive layer (or semiconducting conductor shield) 3 and the profile wire conductor 201. Thus, the conductor tape 7 is preferably tightly arranged onto the profile wire conductor 201 to preserve the indentations 240 in the outer surface of the profile wire conductor 201.

Figure 7:
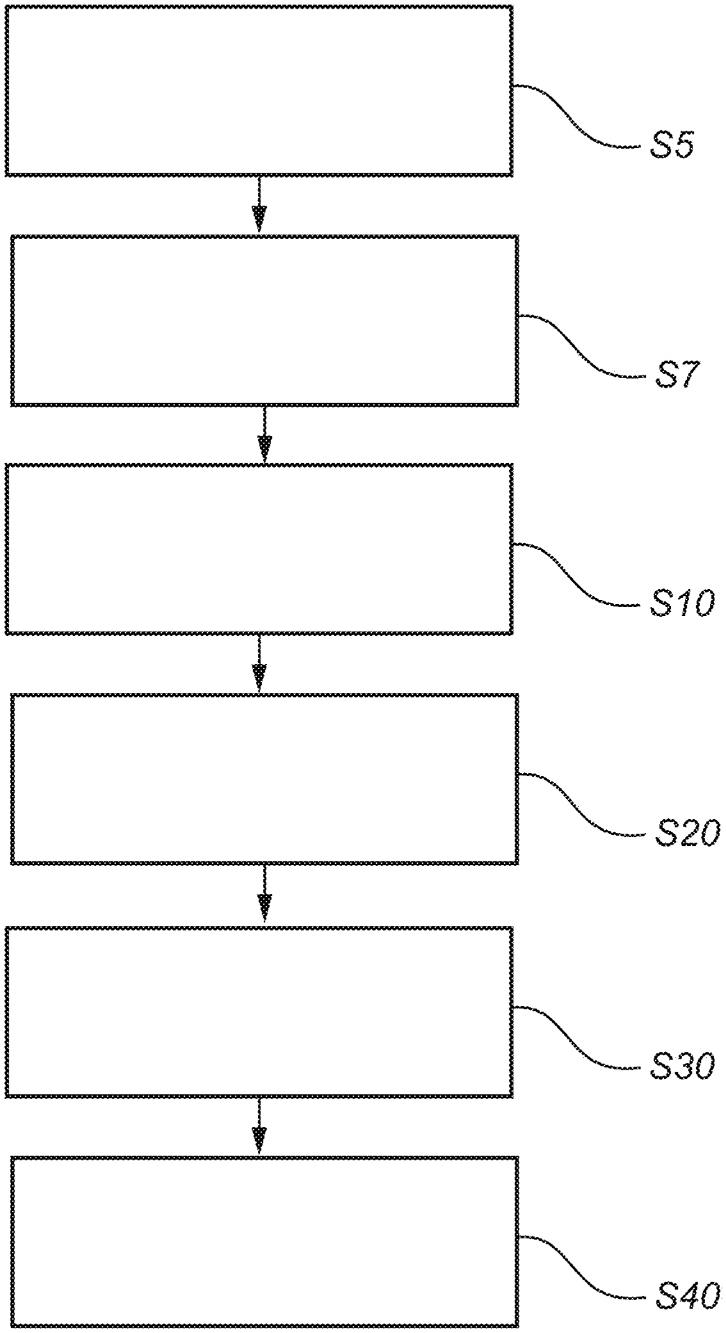
FIG. 7 is a flow chart describing a method of producing at least a part of a power cable according to example embodiments.

A method of producing at least a part of a power cable, such as the profile wire conductor 201, 201' of FIGS. 1-5, or a power cable 1 of FIG. 6, will now be described with reference to the flow chart of FIG. 7.

In a first step, S10, a plurality of profile wires is provided. The profile wires are of at least a first type having a first radial cross sectional geometry and of a second type having a second radial cross sectional geometry being different to the first radial cross sectional geometry. Examples of the first and second types of profile wires were exemplified in FIGS. 1-6.

In a second step, S20, the plurality of profile wires is stranded in concentric wire layers around a central longitudinal axis to form a profile wire conductor having an inner wire layer of profile wires of the first type, and an outermost wire layer of profile wires forming an outer surface of the profile wire conductor in which at least one of the profile wires in the outermost wire layer is of the second type.

The profile wires of the second type form an indentation or protrusion in the outer surface of the profile wire conductor during the step S20 of stranding the plurality of profile wires. The thereby formed profile wire conductor may for example be the profile wire conductor 201 as in FIGS. 1-4. The profile wire conductor is thus an example of at least a part of a power cable produced by the method of the inventive concept.

In a first optional sub-step S5, being performed prior to the first step S10, or as a sub-step of the first step S10, a sub-portion of profile wires is guided into a reshaping tool. In a second optional sub-step S7, being performed subsequently to the first optional sub-step S5, the sub-portion of profile wires is reshaped in the reshaping tool to form profile wires of the second type. For example, the reshaping tool comprises a knife which cuts the sub-portion of the profile wires into the desired radial cross sectional shape. Thus, profile wires of the second type are provided in an efficient manner.

In an optional step S30, performed subsequent to the stranding step S20, a conductor tape is tightly arranged onto the profile wire conductor while preserving the indentation or protrusion in the outer surface of the profile wire conductor.

In an optional step S40, performed subsequent to the stranding step S20, and potentially subsequent to step S30, the profile wire conductor is encased with an insulation system. The thereby formed profile wire conductor and the insulation system may for example be the power cable 1 as in FIG. 6, or at least forming a part of such power cable. The insulation system typically comprises at least one semiconductive layer, or semiconducting conductor shield.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A power cable comprising:

a profile wire conductor, a semiconductive layer arranged around the profile wire conductor forming an interface between the profile wire conductor and the semiconductive layer, the profile wire conductor having a central longitudinal axis and comprising stranded individual profile wires arranged in concentric wire layers around the central longitudinal axis, the concentric wire layers including an inner wire layer of profile wires of a first type having a first radial cross sectional geometry, and an outermost wire layer of profile wires forming an outer surface of the profile wire conductor, at least one of the profile wires in the outermost wire layer being of a second type and having a second radial cross sectional geometry being different to the first radial cross sectional geometry, the profile wire of the second type forming an indentation or protrusion in the outer surface of the profile wire conductor, and a conductor tape forming the interface between the profile wire conductor and the semiconductive layer, wherein the conductor tape is tightly arranged onto the profile wire conductor preserving the indentation or protrusion in the outer surface of the profile wire conductor, wherein the interface is at least partly defined by the indentation or protrusion in the outer surface of the profile wire conductor, and wherein the indentation or protrusion has an extension in the radial direction of between 0.5 mm and 3 mm, and/or wherein the indentation or protrusion has an extension in the circumferential direction of between 0.5 mm and 3 mm.

2. The power cable according to claim 1, wherein any radial cross section along the central longitudinal axis of the profile wire conductor comprises said indentation or protrusion in the outer surface of the profile wire conductor formed by the profile wires of the second type.

3. The power cable according to claim 2, wherein the stranded individual profile wires are helically laid along the central longitudinal axis, and wherein said indentation or protrusion in the outer surface of the profile wire conductor form at least one helically shaped protrusion or indentation following the lay of the profile wires of the outermost wire layer.

4. The power cable according to claim 2, wherein the first radial cross sectional geometry has the shape of an annulus sector, or of a trapezoid.

5. The power cable according to claim 2, wherein the second radial cross sectional geometry has the shape of a pentagon or a hexagon with two of its opposite sides being curved.

6. The power cable according to claim 2, wherein the first and second radial cross sectional geometries are non-congruent in shape and in size.

7. The power cable according to claim 2, wherein at least one of the profile wires in the outermost wire layer is of a third type and having a third radial cross sectional geometry being different to the second radial cross sectional geometry.

8. The power cable according to claim 1, wherein the stranded individual profile wires are helically laid along the central longitudinal axis, and wherein said indentation or protrusion in the outer surface of the profile wire conductor form at least one helically shaped protrusion or indentation following the lay of the profile wires of the outermost wire layer.

9. The power cable according to claim 1, wherein the first radial cross sectional geometry has the shape of an annulus sector, or of a trapezoid.

10. The power cable according to claim 1, wherein the second radial cross sectional geometry has the shape of a pentagon or a hexagon with two of its opposite sides being curved.

11. The power cable according to claim 1, wherein the first and second radial cross sectional geometries are non-congruent in shape and in size.

12. The power cable according to claim 1, wherein at least one of the profile wires in the outermost wire layer is of a third type and having a third radial cross sectional geometry being different to the second radial cross sectional geometry.

13. The power cable according to claim 1, wherein the semiconductive layer forms at least a part of an insulation system, and wherein the indentation or protrusion is designed to reduce shrink back of the insulation system.

14. A method for producing at least a part of a power cable, the method comprising:

providing a plurality of profile wires of at least a first type having a first radial cross sectional geometry and of a second type having a second radial cross sectional geometry being different to the first radial cross sectional geometry;

stranding the plurality of profile wires in concentric wire layers around a central longitudinal axis to form a profile wire conductor having an inner wire layer of profile wires of the first type, and an outermost wire layer of profile wires forming an outer surface of the profile wire conductor in which at least one of the profile wires in the outermost wire layer is of the second type, encasing the profile wire conductor with an insulation system comprising a semiconductive layer arranged around the profile wire conductor forming an interface between the profile wire conductor and the semiconductive layer, wherein the profile wires of the second type form an indentation or protrusion in the outer surface of the profile wire conductor during the step of stranding the plurality of profile wires, the indentation or protrusion having an extension in the radial direction of between 0.5 mm and 3 mm and/or an extension in the circumferential direction of between 0.5 mm and 3 mm, wherein the interface formed during the step of encasing the profile wire with the insulation system is at least partly defined by the indentation or protrusion in the outer surface of the profile wire conductor, wherein the method further comprises tightly arranging a conductor tape onto the profile wire conductor while preserving the indentation or protrusion in the outer surface of the profile wire conductor, the conductor tape forming the interface between the profile wire conductor and the semiconductive layer.

15. The method according to claim 14, further comprising:

guiding a sub-portion of profile wires into a reshaping tool;

reshaping said sub-portion of profile wires in said reshaping tool to form profile wires of the second type.

16. The method according to claim 14, wherein the indentation or protrusion is designed to reduce shrink back of the insulation system.

* * * * *